United States Patent
Gedcke et al.

[11] Patent Number: 5,995,989
[45] Date of Patent: Nov. 30, 1999

[54] METHOD AND APPARATUS FOR COMPRESSION AND FILTERING OF DATA ASSOCIATED WITH SPECTROMETRY

[75] Inventors: Dale A. Gedcke, Oak Ridge; Russell D. Bingham, Knoxville; Susan Haywood, Oak Ridge, all of Tenn.

[73] Assignee: EG&G Instruments, Inc., Wellesley, Mass.

[21] Appl. No.: 09/065,733

[22] Filed: Apr. 24, 1998

[51] Int. Cl.⁶ .................................................. G06F 17/10
[52] U.S. Cl. .......................................... 708/300; 708/203
[58] Field of Search .................................. 708/300, 303, 708/445, 203, 322

[56] References Cited

U.S. PATENT DOCUMENTS

| | | | |
|---|---|---|---|
| 4,490,806 | 12/1984 | Enke et al. | 15/364 |
| 4,658,368 | 4/1987 | Blais | 708/300 |
| 5,052,027 | 9/1991 | Poklemba et al. | 708/300 |
| 5,150,317 | 9/1992 | Countryman | 708/300 |
| 5,428,357 | 6/1995 | Haab et al. | 1/341 |
| 5,592,402 | 1/1997 | Beebe et al. | 7/364 |
| 5,771,182 | 6/1998 | Baker et al. | 708/300 |
| 5,774,385 | 6/1998 | Bristol | 708/203 |

OTHER PUBLICATIONS

Jenkins, Ron, R. W. Gould and Dale Gedcke, General Computer Applications and Quantitative Spectrum Analysis as Applied to Energy–Dispersive Analysis, Chapter 6, Marcel Dekker, New York, 1969, pp. 329–362.

*Primary Examiner*—David H. Malzahn
*Attorney, Agent, or Firm*—Pitts & Brittian, P.C.

[57] ABSTRACT

A method and apparatus for compression and filtering of data associated with spectrometry. The method and apparatus serves to recognize peak events and filter data associated with background noise, thereby reducing the volume of data to be transferred to storage and the data transfer rate required for storing the desired data. The method of the present invention monitors the value of each data point as it is encountered and compares it to the previously encountered data to determine whether it is on or very near a peak. The y values for each data point are continuously summed and averaged to determine the average background level. The deviation $\delta_i$ is determined for each subsequent data point and is used to determine a threshold. Each subsequent data point is compared to the threshold and, if found to be above the threshold, is assumed to be part of or very near a peak. At this point, the averaging is stopped until a subsequent data point is determined to be below the threshold. After any peaks have been detected, all or a portion of the data associated the background noise and scatter in the spectrum may be discarded, with only the data relevant to the peaks, and any other desired data kept. Other desired data may include data associated with background noise close to each peak, every $n^{th}$ data point, the first group of data points encountered, and data corresponding to the first and last groups of data points in each block of data. The sensitivity may be varied to raise the threshold with respect to the average background level and eliminate errant background noise from appearing as a peak.

34 Claims, 7 Drawing Sheets

Fig. 7

METHOD AND APPARATUS FOR COMPRESSION AND FILTERING OF DATA ASSOCIATED WITH SPECTROMETRY

TECHNICAL FIELD

This invention relates to the field of data processing. More specifically, the present invention is related to a method and apparatus for filtering and compressing data derived from mass spectrometry.

BACKGROUND ART

In the field of data processing, and especially in association with mass spectrometry, it is well known that the volume of data collected can be relatively large when compared to conventional data storage devices. It is also well-known that a typical spectrum includes a high percentage of data attributable to useless information.

For purposes of illustration of the volume of data which may be collected using conventional methods, a typical spectrum having 262,144 (256K) points and a height of three bytes is examined. In this example, one complete spectrum requires 768 kB of storage space. At a data acquisition rate of ten spectra per second, data flow is 7.5 MB/sec. However, it is well known that data acquisition rates may be higher than that illustrated. Comparing the data acquisition rate of 7.5 MB/sec to a standard, continuous, I/O rate for a conventional hard drive of 5 MB/sec, it is clear that data compression is required in order to sustain data transfer at the rate of ten (10) spectra/second for a period of thirty (30) minutes. A compression ratio of 2:1 would allow continuous transfer of the compressed data to a hard disk.

In the above example, for a data acquisition period of 30 minutes, a total storage space of approximately 14 GB is required for uncompressed data. For currently available hard disk drives of 8 GB capacity, a compression ratio of 2:1 will allow storage of the compressed data. Compression ratios greater than 2:1 are useful for compressing the data into an even smaller storage capacity.

In U.S. Pat. No. 5,592,402, Beebe, et al., teach a method for comparing spectra typically acquired from a chromatograph run on a production sample to the spectral features from a calibration standard for the purpose of detecting a maverick spectrum or for detecting a sample whose composition lies outside tolerable limits. Beebe, et al., describe methods for separating a spectrum into components comprising peaks, background, and noise. These methods are well-known in the art as described by Coldwell, Robert L. and Gary J. Bamford, *The Theory and Operation of Spectral Analysis Using ROBFIT*, American Institute of Physics, New York, 1991; Jenkins, Ron, R. W. Gould, and Dale Gedcke, *Quantitative X-Ray Spectrometry*, Chapter 6, Marcel Dekker, New York, 1981; Bevington, Phillip R., and D. Keith Robinson, *Data Reduction and Error Analysis for the Physical Sciences*, McGraw-Hill, New York, 1969; and Mariscotti, M. A., *Nucl. Instrum. & Methods*, 50, page 309 (1967).

U.S. Pat. No. 5,428,357 issued to D. Haab, et al., discloses a method for compressing data to achieve high speed data acquisition. The data compression schemes disclosed by Haab, et al., involve generating a first difference spectrum and coding sequentially repeated numbers by the common value and a number that specifies the number of times that number is repeated. However, Haab, et al., do not disclose a method for determining which portions of the data are not useful and which, therefore, may be discarded. Accordingly, unwanted data, though potentially compressed, is maintained.

U.S. Pat. No. 4,490,806 issued to C. G. Enke, et al., teaches yet another method for data compression associated with spectral analysis. In the method disclosed by Enke, et al., a fixed threshold is assigned to the data, with any data above the threshold being kept as peak data and any data below the threshold being discarded as background noise. However, there is no provision for continuously determining the threshold based upon the current values of noise in the background data. Because the threshold is fixed, there is no provision for accounting for lower peaks falling within regions of the spectrum having lower background noise levels.

The prior art of record does not disclose a method for adaptively filtering spectrometry data for compression of the same in order to eliminate the transfer and storage of unnecessary data such as background and noise.

Accordingly, it is an object of this invention to provide a means for filtering background and noise data from a spectrum in order to minimize the data transfer rate and storage requirements for the spectrum.

It is also an object of the present invention to provide such a means whereby peak data and data immediately preceding and immediately following the peak is kept while remaining data is discarded.

Another object of the present invention is to provide such a means for filtering and compressing data whereby the scatter associated with the spectrum is determined using a background noise estimate which is adaptive to ensure an accurate estimate of the scatter, thereby improving the accuracy in separating peaks from background to improve the detection limits for peaks whose amplitudes are close to the noise level in the background.

Still another object of the present invention is to provide such a means for filtering and compressing data whereby any lag in the startup of the data collection at the beginning of a spectrum is accounted for.

Further, it is an object of the present invention to provide a means whereby an increase or decrease in the background is recognized as such, without being misinterpreted as being a wide peak.

Yet another object of the present invention is to provide such a filtering and compression device whereby the sensitivity thereof is adjusted in order to compensate for sparse data.

Another object of the present invention is to provide a periodic sampling of the discarded background in order to preserve a minimal record of the shape of the background.

DISCLOSURE OF THE INVENTION

Other objects and advantages will be accomplished by the present invention which serves to recognize peak events and filter data associated with background and noise, thereby reducing the volume of data to be transferred to storage. In so doing, the rate at which data must be transferred and the storage space required for storing the desired data are both reduced by a typical ratio of 7:1. The method of the present invention monitors the value of each data point as it is encountered and compares it to the previously encountered data to determine whether it is on or very near a peak. The y values for a designated number of data points preceding the tested data point are summed and averaged to determine the average of the noisy background. The magnitudes of the deviations of the y values from the average background for a designated number of data points preceding the tested data point are averaged by one of several optional methods to determine the deviation δ of the local noise superimposed on the background. A threshold is determined by multiplying the deviation δ by a constant k and adding the result to the average background level. Each subsequent data point is compared to the threshold and, if found to be above the threshold, is assumed to be part of or very near a peak. At this point, the averaging is stopped until a subsequent data point is determined to be below the threshold. When the data points again fall below the threshold, averaging is resumed as before, except that the data points identified as belonging to a peak are barred from use in the averaging.

After any peaks have been detected, all or a portion of the data associated with the background in the spectrum may be discarded, with only the data relevant to the peaks, and any other desired data kept. To this extent, it may be desirable to keep data associated with background close to each peak. For example, it may be useful to keep data for a number of data points on either side of the peak. This is beneficial for obtaining an accurate estimate of the net area of the peak above the background level. By storing data in a memory buffer while performing the above described methods, after the peaks have been determined, the data for a given number of data points immediately preceding the peak, those data points within the peak, and a given number of data points immediately following the peak will all be transferred to a storage medium, with the remaining data discarded. It may also be desirable to maintain data for every $n^{th}$ data point. This permits retaining a sample of the background data, while rejecting n–1 background points for every point retained. If n is a large number, for example n=100, significant compression of the background data is achieved.

In order to initialize the averaging method of the present invention, and further to overcome any lag in the start up time of detection equipment, the present method provides for special analysis of the first group of data points encountered. Further, because data being encountered is processed in blocks for filtering prior to the storage of selected data and discarding of the remainder, it may also be desirable to keep the data corresponding to the first and last groups of data points in each block of data.

In some spectra, as the background noise decreases toward the end thereof, a resulting problem is that background rejection is degraded as the noise in sparse background data can begin to appear to be peaks in the data. In order to resolve this issue, the constant k is increased in order to raise the threshold with respect to the average background level and eliminate errant background noise from appearing as a peak. Alternatively, a limiting minimum value for the threshold above the average background can be employed to reduce high sensitivity for sparse data.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 6:
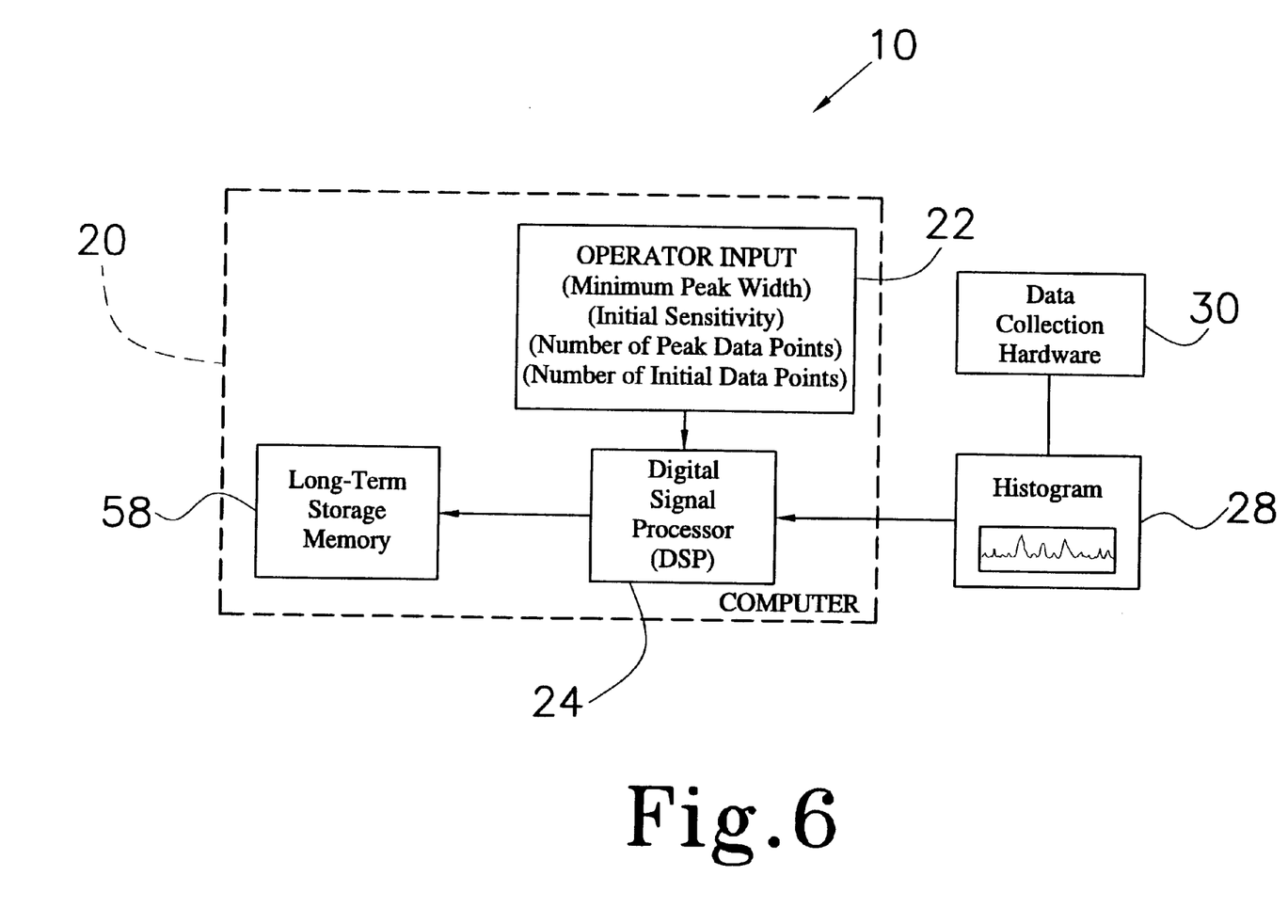
FIG. 6 is a schematic illustration of the apparatus of the present invention.
Figure 7:
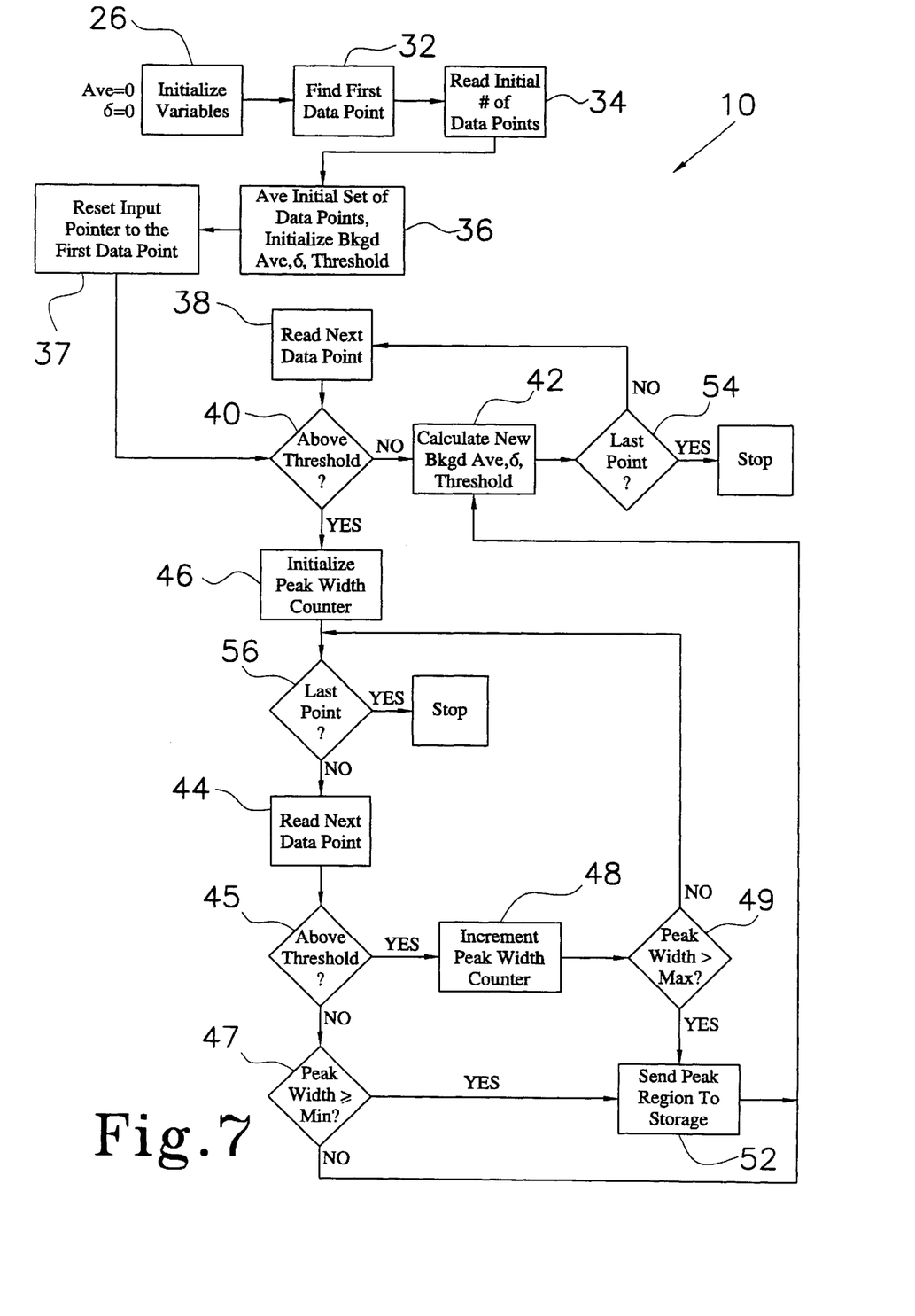
FIG. 7 is a schematic illustration of the method of the present invention as performed on the apparatus of the present invention.

A method and apparatus for compression and filtering of data associated with spectrometry incorporating various features of the present invention is illustrated generally at 10 in FIGS. 6 and 7. The method and apparatus for compression and filtering of data associated with spectrometry, or method 10, is designed for recognizing peak events and filtering data associated with background and noise, thereby reducing the volume of data to be transferred to storage. In so doing, the data transfer rate and the storage space required for storing the desired data is reduced by a ratio of typically 7:1. For example, a 14 GB volume of uncompressed data is filtered and compressed to typically require no more than 2 GB of hard drive space. In the preferred embodiment of method 10, testing has proven that the required space may be reduced by a factor of ten to thirty, with potentially greater results with a spectrum having few or no peaks.

In the disclosure that follows, it is presumed that the data points in the spectrum are sequentially processed from left to right. It will be understood that an equivalent result can be obtained by processing from right to left. Accordingly, the present invention is not intended to be limited to either processing direction.

Figure 1:
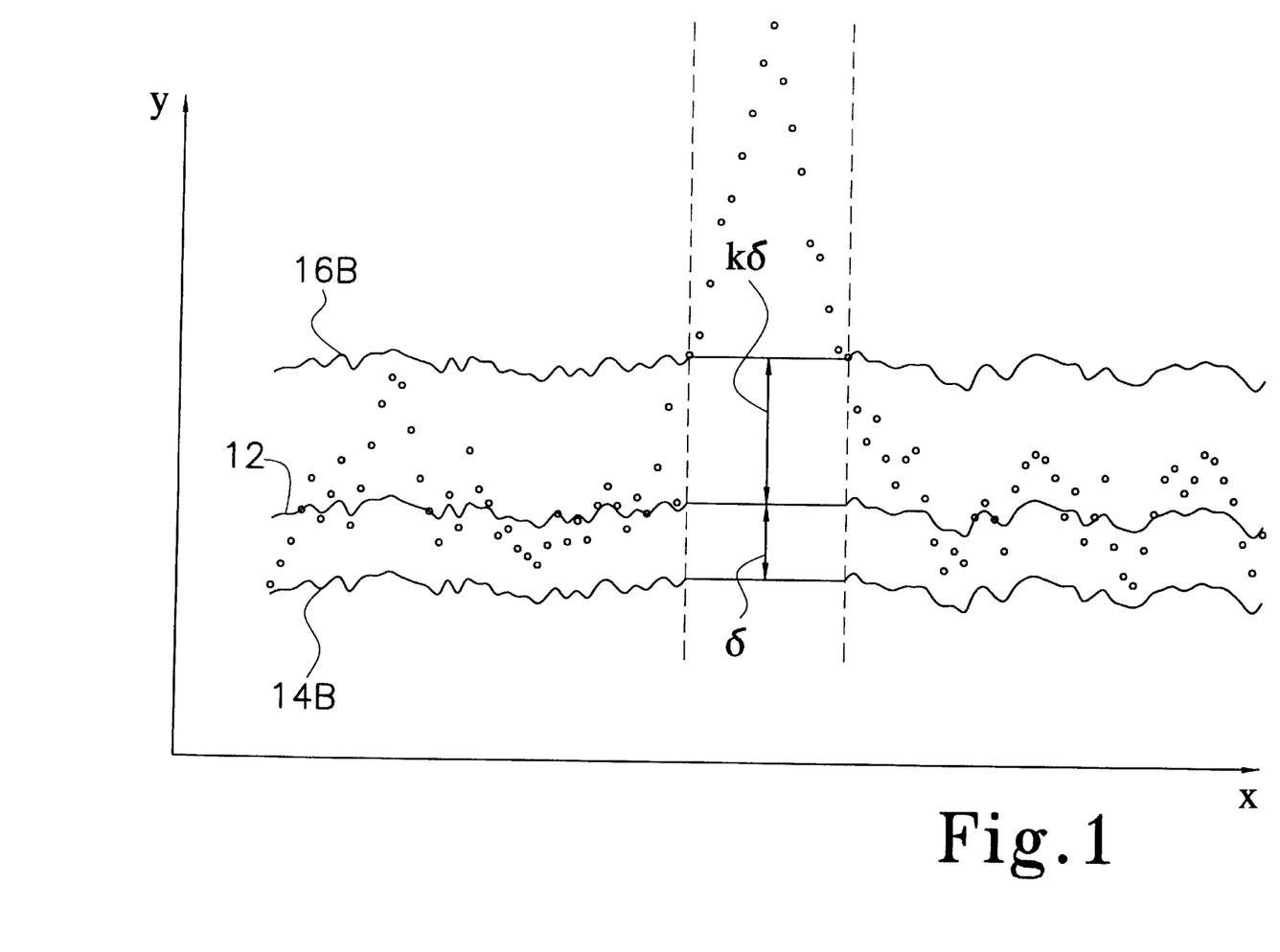
FIG. 1 illustrates a portion of a spectrum to be filtered and compressed using the method and apparatus of the present invention.

The basic approach of the present invention is to monitor the value of each data point i as it is encountered and compare it to the previously encountered data to determine whether it is on or very near a peak. Ideally, any data which does not fit this criterion is discarded. However, as it will be discussed below, the present invention provides for the storage of non-peak data where intermediate sampling is desired. FIG. 1 illustrates the general principal of the method 10. It will be noted at the outset that the scale in the Figures is exaggerated in order to illustrate how the data and its various characteristics change. Illustrated is a small portion of a spectrum having a number of data points, each with an x-coordinate, indicative of the particular atomic weight of an ion striking a detector in a mass spectrometer, for example, and a y-coordinate, indicative of the number of ions in the sample in the above example. The first step in the basic approach of the present method 10 is to determine which of these data points is considered background and which are considered to be part of or very near a peak. To do this, the y values for a designated number of data points preceding each tested data point are summed and averaged to determine the average background level, which is illustrated diagrammatically at 12 for the illustrated data set. The average background level 12 is calculated in succession for each data point that does not prove to be a part of a peak.

The deviation δ of the noise that is superimposed on the average background level 12 is calculated as follows. For each data point tested, a designated number of preceding data points is selected. For each of the selected preceding data points, the difference, $\delta_i$, between the $y_i$ value and the current average background level 12 is calculated. The absolute value of this difference is summed and averaged for all the designated preceding data points to form the average noise deviation δ.

The lower limit 14 is derived by subtracting the deviation δ from the level 12. A threshold 16 is determined by multiplying the deviation δ by a constant k and adding the result kδ to the level 12. The constant k is chosen by the operator of the apparatus used to perform the present method 10, and is typically within the range of 1 to 10. A low value of k ensures the detection of the smallest peaks, but risks accepting some of the background noise. A high value of k ensures rejecting all the background noise, but risks rejection of small peaks. Consequently, the operator predetermines the value k according to the desired sensitivity for peaks near the detection limit set by the background noise. Each subsequent data point i is tested in comparison with the most recent value of the threshold 16 and, if found to be above the threshold 16, is assumed to be part of or very near a peak. At this point, the averaging is stopped until a subsequent data point i is determined to be below the threshold 16. In other words, points identified as exceeding the threshold 16 belong to a peak and are excluded from the averaging processes that determine the average background level 12 and the threshold 16. When the data points again fall below the threshold 16, averaging is resumed as before and at least the data encountered during the interim is identified as a peak and is input to a storage device. On the illustrated graphs, the value of the level 12, the lower limit 14, and the threshold 16 remain level through each peak, indicating that no averaging is occurring while the peak is being detected.

Determining the average background level 12 has been generally described as averaging the y values over a designated number of preceding data points. This provides equal weighting of the data in each of the designated data points. The number of designated data points is typically selected to be 100 times the anticipated minimum peak width $PW_{min}$.

In an alternate averaging method, older data points are weighted exponentially, with the subsequent data point i being weighted more heavily. The following is an exemplary equation for determining the level 12:

$$y_{Ave-NEW} = y_{Ave-OLD} \exp(-1/\tau_y) + (1-\exp(-1/\tau_y))y_i$$

where $\tau_y$ is a time constant. This method provides higher weighting of the more recent data points. The time constant $\tau_y$ of the preferred embodiment is typically determined by the equation:

$$\tau_y = m_y \times PW_{min}$$

where $m_y$ is a large number so that $\tau_y$ is large compared to the width of a peak, and $PW_{min}$ is a minimum peak width selected by the operator of the present method 10. The number $m_y$ may be, for example, 100. The minimum peak width $PW_{min}$ may be selected, for example, to be equal to three, such that if fewer than three consecutive data points are higher than the threshold 16, then none of the data points is considered part of a peak, and all are treated as background noise.

In general, the methods of equal weighting or exponential weighting are also applied to deriving the average noise deviation δ. Specifically, the exponential averaging method may be applied to finding the average noise deviation δ by the following equations:

$$\delta_{NEW} = \delta_{OLD} \exp(-1/\tau_\delta) + (1-\exp(-1/\tau_\delta))|\delta_i|$$

where $\tau_\delta$ is a time constant determined by the equation:

$$\tau_\delta = m_\delta \times PW_{min}$$

where $m_\delta$ is a large number so that $\tau_\delta$ is large compared to the minimum peak width $PW_{min}$.

In a contrary situation, the average background level 12 may suddenly increase to a higher plateau, giving the indication that a very wide peak has occurred. In order to prevent an errant reading such as this, a peak width maximum $PW_{max}$ may be selected by the operator. For example, the operator may select a maximum peak width $PW_{max}$ of 400 data points. If the detected peak width exceeds 400 data points, then the averaging is resumed and the next data point i is used in determining the next level 12. In this instance, the next data point i may still be above the threshold 16, thus starting the peak width count again. However, after the peak width maximum $PW_{max}$ has expired, the next data point i will be considered as noise. This may continue, while only considering every $400^{th}$ data point until the background noise is found.

Having described the method in general principal, following are several specific approaches to refine the method 10 for filtering and compressing spectral data. Each of the following approaches tracks the noise deviation δ in the background and provides a peak detection threshold 16 that adapts to changing noise deviations δ in the spectrum. Further, each approach uses the same procedures previously described for determining a) the average background level 12, and b) threshold 16, from the average background level 12 and the level 14.

APPROACH A

Figure 2:
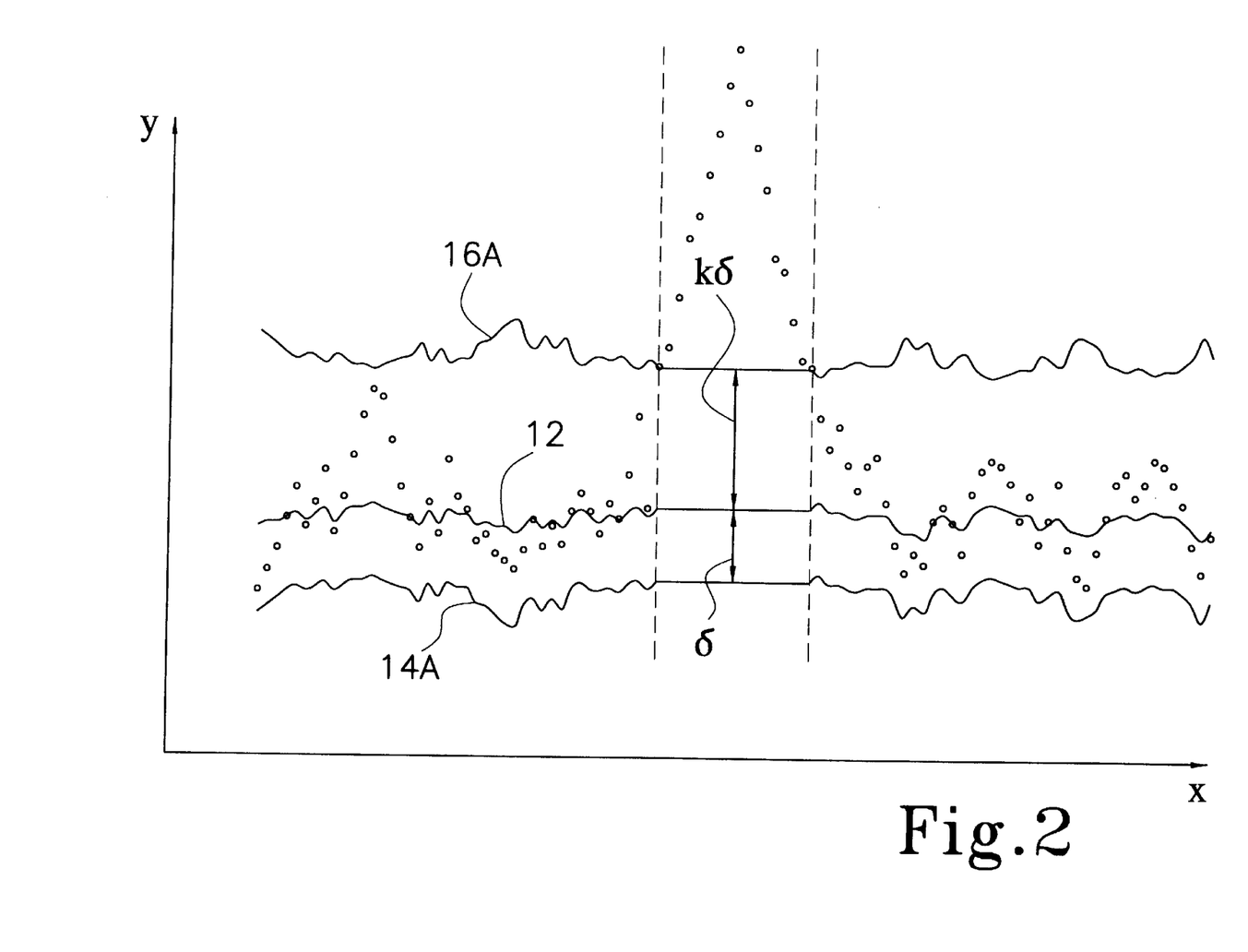
FIG. 2 illustrates the spectrum of FIG. 1 to be filtered using an alternate embodiment of the method and apparatus of the present invention.

In Approach A for accomplishing the present method 10A, the deviation δ is modified only by those data points which are more negative than, or fall below, the average background level 12. If a data point is more positive than the average background level 12, it is not considered in calculating the deviation δ. This prevents the onset of a peak from erroneously increasing the threshold 16. This approach generates the level 14A and threshold 16A illustrated in FIG. 2.

APPROACH B

In Approach B for accomplishing the present method 10B, data points falling both above and below the background noise estimate are considered. In this approach, the deviation δ is determined by averaging the absolute value of the difference between $y_i$ and $y_{AVE}$ for the designated number of data points preceding the tested point, where $y_{AVE}$ is the average background level 12. The resulting δ is then subtracted from the average background level 12 to obtain level 14B. As in the general description of the present method 10, the deviation δ is also multiplied by the constant k and the product kδ added to the average background level 12 to acquire a threshold 16B at the data point i. The results of this approach are most clearly illustrated in FIG. 1. This approach uses more of the information available in the background as compared to Approach A.

APPROACH C

Figure 3:
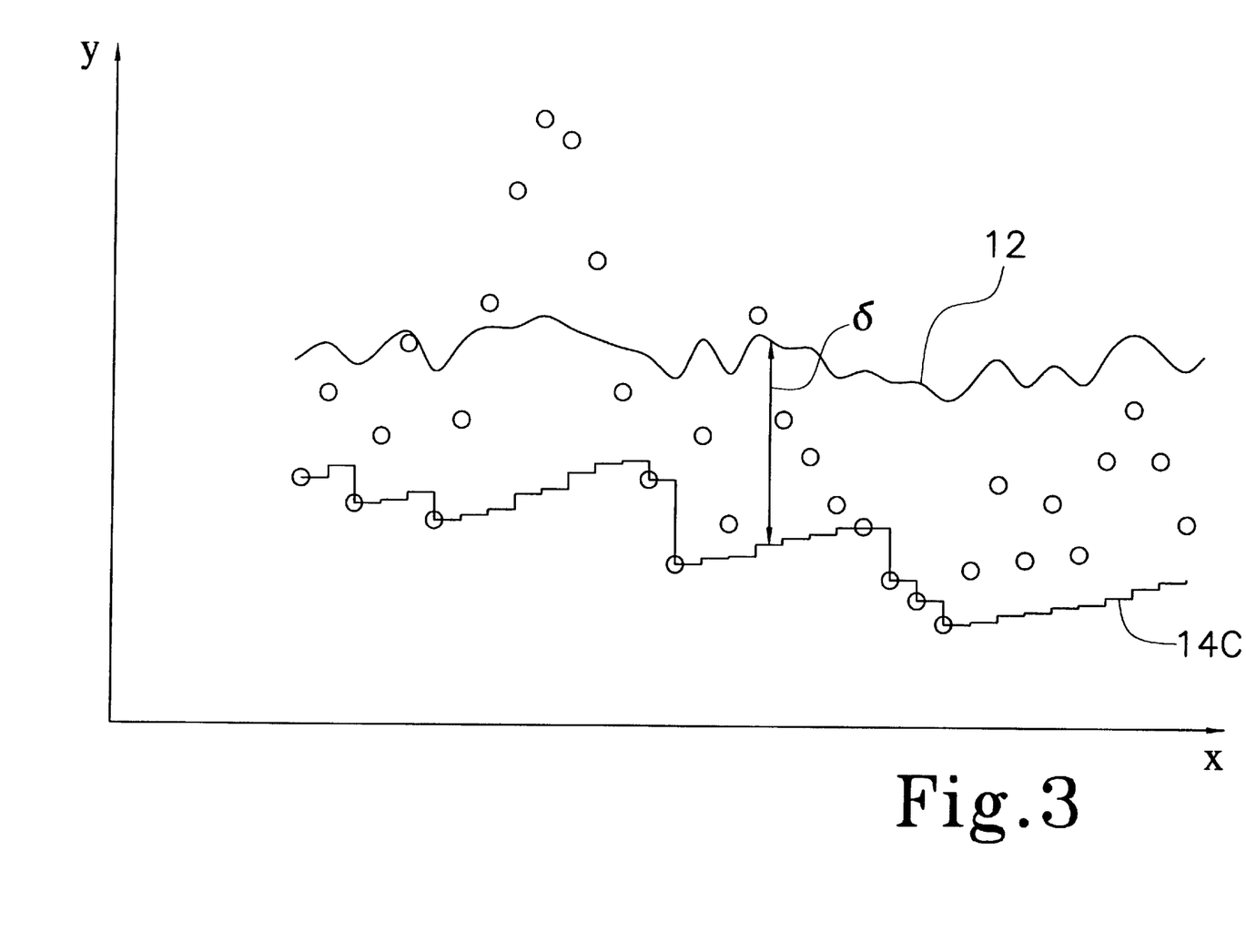
FIG. 3 illustrates a portion of the spectrum of FIG. 1 to be filtered using a further alternate embodiment of the method and apparatus of the present invention.

Approach C for accomplishing the method 10C of the present invention is illustrated in FIG. 3. The deviation δ is determined by seeking the most negative data point i. FIG. 3 illustrates a portion of a spectrum having a number of data points within the background noise portion thereof The deviation δ in method 10C is accomplished by comparing the subsequent data point $y_i$ value to the immediately previous value of level 14C. If $y_i$ is less than the previous value of level 14C, then the level 14C is set equal to $y_i$ However, if $y_i$ is greater than the previous value of level 14C, then the level 14C is stepped toward level 12 by a small fraction of the current deviation δ. In the preferred embodiment, the positive step is typically one percent (1%) of the deviation δ.

In this method 10C, it is seen that the most negative deviation $δ_i$ is sought, while providing a mechanism for gradually relaxing toward lower noise amplitudes. Hence, the difference between the average background level 12 and the level 14C tracks the noise deviation δ and adapts to changes therein. As in the previous methods 10, when the data acquired has a $y_i$ value greater than the threshold 16, the averaging is suspended until the $y_i$ value once again falls below the threshold 16. Accordingly, a graphical display of the computed averages shows a straight horizontal segment during detection of a peak.

APPROACH D

Figure 4:
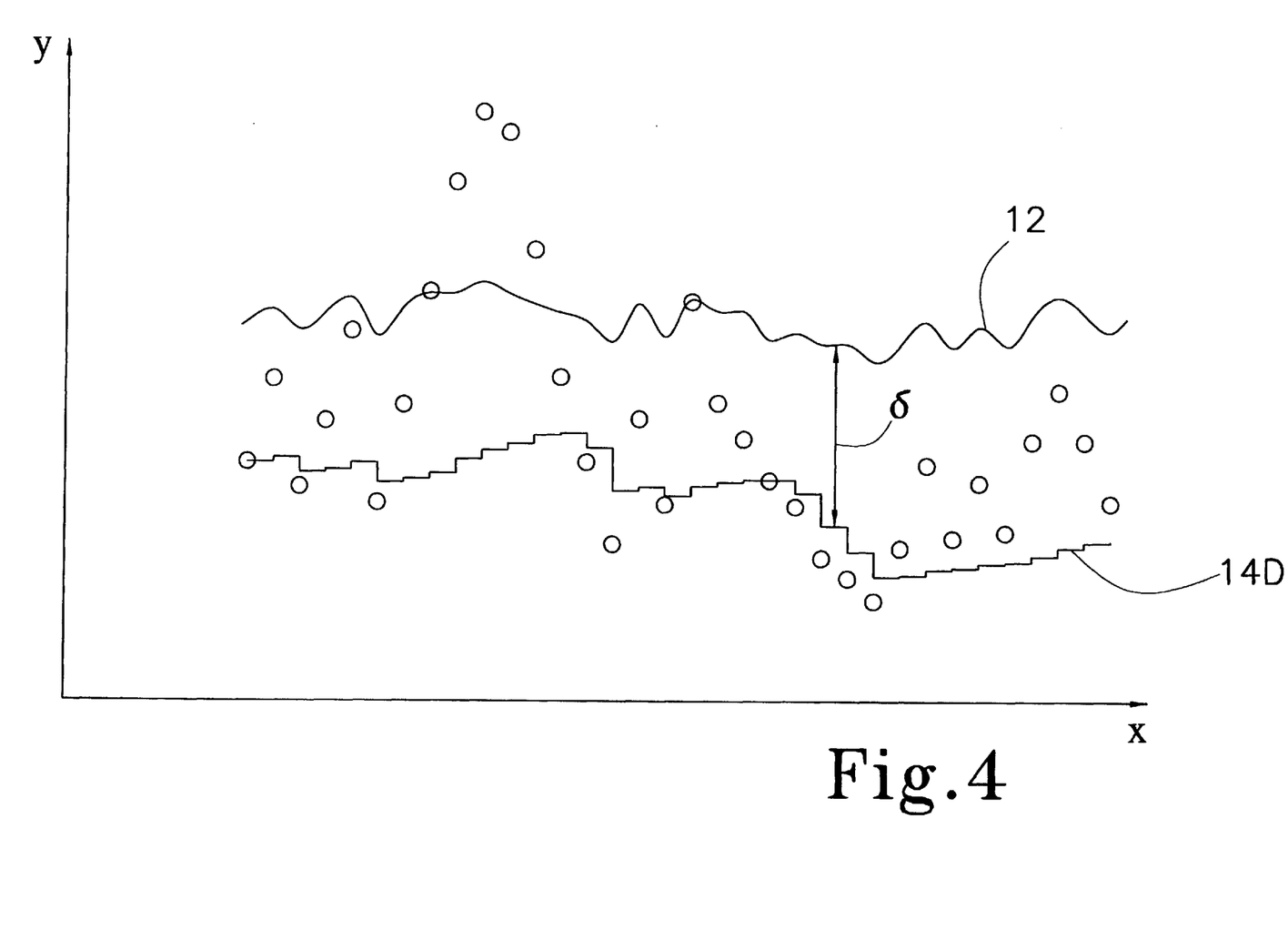
FIG. 4 illustrates a portion of the spectrum of FIG. 1 to be filtered using a further alternate embodiment of the method and apparatus of the present invention.

Finally, a refinement of the above method 10C is illustrated in FIG. 4. In the method 10D of the present invention, the deviation δ is determined in much the same way as in the method 10C described immediately previous, except that if $y_i$ is less than the current value of level 14D, then level 14D is stepped toward $y_i$ by a fraction of the distance between level 14D and $y_i$. In the preferred embodiment, the fraction is typically ½. Compared to Approach C, Approach D is less sensitive to large negative excursions of individual data points, and thus provides a smoother level 14D.

From any of the methods 10 described above, the peaks associated with a spectrum are readily detectable. After such peaks have been detected, all or a portion of the data associated the background noise and scatter in the spectrum may be discarded, with only the data relevant to the peaks, and any other desired data kept. To this extent, it may be desirable to keep data associated with background noise close to each peak. For example, it may be useful to keep data for ten (10) data points on either side of the peak. This makes it possible to estimate the background on either side of the peak for the purpose of subtracting the background under the peak by interpolation. Subtraction of the background under a peak is important for accurately calculating the net area under the peak. By storing data in a memory buffer while performing the above described methods, after the peaks have been determined, the data for the ten data points immediately preceding the peak, those data points within the peak, and ten data points immediately following the peak will all be transferred to a storage medium 58, with the remaining data discarded. It may also be desirable to maintain data for every $n^{th}$ data point. In this instance, without regard to the position of the data point with respect to any peaks, every $n^{th}$ data point is transferred to storage. For example, it may be useful to keep information relevant to every $200^{th}$ data point. This provides a sampled record of the background between peaks, while reducing the number of background data points by a factor of n-1, or in the example, by a factor of 199.

In order to initialize the averaging methods described above, and further to overcome any lag in the start up time of detection equipment, the present method provides for special processing of the first group of data points encountered. For example, a starting estimate of the average background level 12 and the level 14 is obtained by averaging the y values in the first group of data points without deleting data points in peaks. The starting values for the average background level 12 and level 14 are set equal to this average and the normal filtering process is restarted at the first data point. Alternatively, the most recent values of the average background level 12 and the level 14 from a previous spectrum can be used as starting values.

In cases where the processing memory allocated is smaller than the total length of the spectrum, it is convenient to section the spectrum into successive blocks for filtering. When filtering the spectrum via multiple blocks, it may also be desirable to keep the data corresponding to the first and last groups of data points in each block of data. For example, using the previous example wherein the ten data points immediately preceding and following a peak are kept, it may be desirable to keep the first and last ten data points of each block of data. In so doing, if a peak occurs at a break point in the data, the peak will not be lost when the filtered data is discarded.

In either of these examples wherein data corresponding to events other than at or near peaks is kept, it will be seen that the percentage of the total data is relatively small. To keep one of every 200 data points, for example, accounts for only one-half percent (½%) of the total data. Or, in the last example, to keep the first and last ten data points out of a block size of 1 k accounts for only 2% of the total buffered data.

Figure 5:
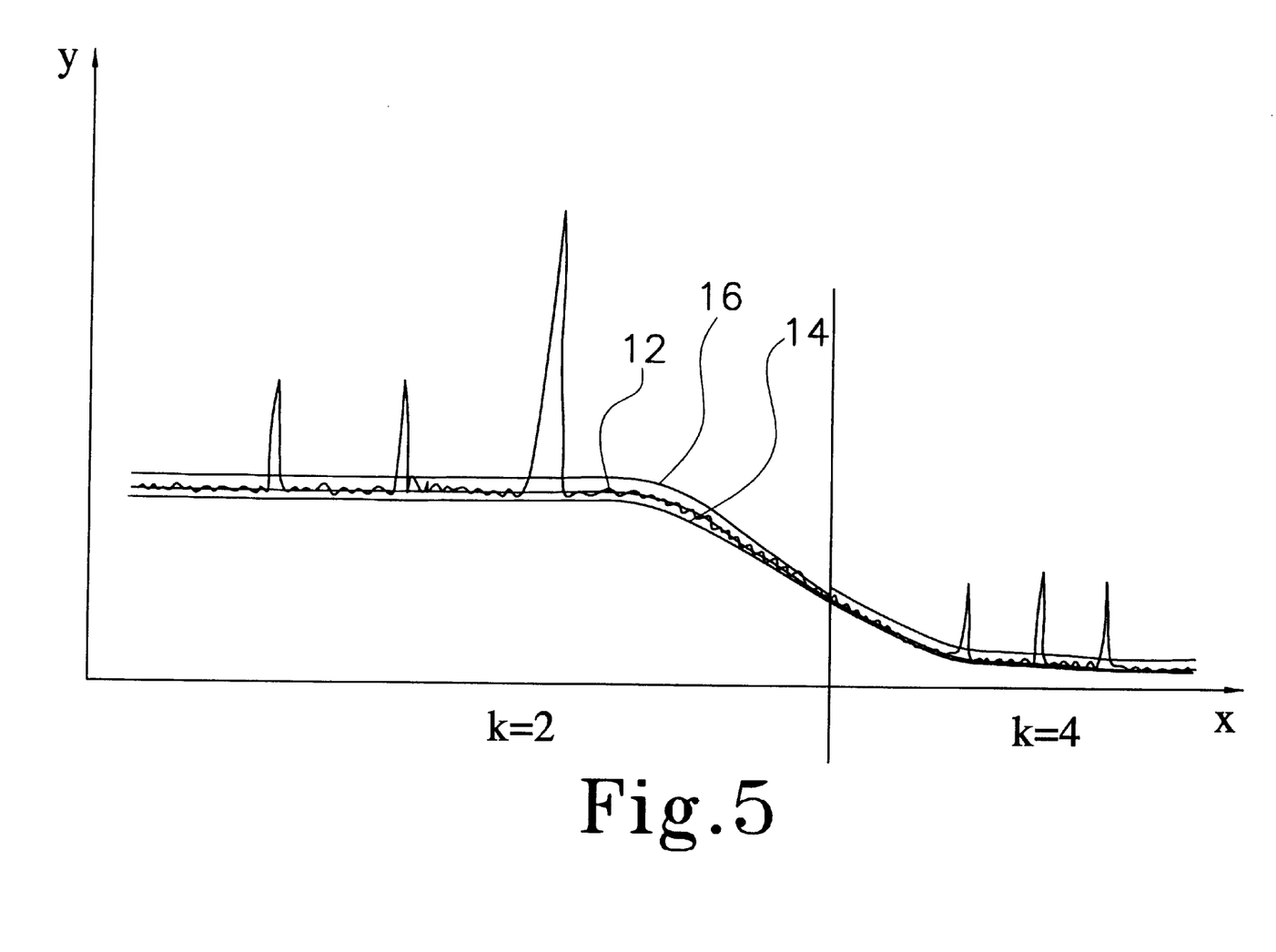
FIG. 5 illustrates a spectrum to be filtered using a further alternate embodiment of the method and apparatus of the present invention, whereby the sensitivity is decreased when data levels fall below a predetermined level.

In some spectra from time-of-flight mass spectrometry, regions of sparse data can occur when the detected ion arrival rates are very low, as illustrated in FIG. 5. In such cases, the sparse data can cause the background noise to be underestimated. The method 10 of the present invention includes two alternative solutions for sparse data. The first solution increases the value of the sensitivity constant k when the y values are below a predetermined value. The second solution specifies a limiting minimum value for the product kδ. Both methods prevent erroneously identifying background noise as peaks when the y data is sparse. If the product kδ were to fall below a limiting minimum value of, for example, 12, then the threshold 16 is generated by a value of kδ equal to 12.

The various features of the present method 10 are illustrated schematically in FIG. 6. Operator input is made to a computer 20 via a conventional keyboard, mouse, or other input device 22. Operator input, as discussed above includes a minimum peak width $PW_{min}$, an initial sensitivity constant k, the number of data points on either side of a peak to be kept, the number of initial data points to be kept, the number of data points at the beginning and ending of each set of block of data, and the like. Either a second sensitivity constant $k_2$ or a minimum value of the product kδ may also be input by the operator as desired in low data situations as described above. Further, a frequency value n may be input to keep every $n^{th}$ data point, regardless of whether or not it is identified as falling in a peak. Any other variables which may be set by the operator are input as well. Of course, other conventional controls such as interrupts are provided at the operator interface.

The data input by the operator and data such as the illustrated histogram memory 28 generated by data collection hardware 30 are received by a digital signal processor (DSP) 24 which then begins to buffer and analyze the data, and then store selected portions of the data in long term storage memory 58. The DSP 24 can be a part of the computer 20, or it can be separately located at the output of the histogram memory 28. In cases where processing speed is not critical, the DSP 24 can be replaced with the central processing unit (CPU) of the computer 20. The long-term storage memory 58 can be random access memory (RAM) in the computer 20, a hard disk, or any other mass storage medium. As illustrated at 26 in FIG. 7, the DSP 24 initializes variables used in determining the average background level 12 and the deviation δ. After initialization, the DSP 24 begins with the first data point from the histogram memory 28, as illustrated at 32. The first set of data points is then read 34 and averaged 36, the number in the first set of data points being input by the operator, or being set as a default. For example, this data set may typically include 2,000 data points. From averaging these data points, an initial level 12 and deviation δ are determined using these data points. As illustrated at 37, the DSP 24 then goes back to the initial data point found at 32 and proceeds to read each data point, as at 38, compare each subsequent data point to the current threshold 16, as at 40, to determine whether the data point is above the threshold. If the data point is not above the threshold 16, a new level 12, a new deviation δ, and a new threshold 16 (level 12 plus kδ) are determined, as illustrated at 42. This process is continued for each data point in the data set until the data set has been exhausted.

If a data point is identified as being above the threshold 16, the averaging ceases and subsequent data points are analyzed until one falls below the threshold 16. First, a peak width counter is initialized as illustrated at 46. Next, it is determined at 56 whether the data point is the last data point in the spectrum. If the data point is not the last data point in the spectrum, the next data point is read as at 44 and compared to the current threshold 16 as at 45. If the data point is not above the threshold 16, the peak width counter is compared to the minimum peak width $PW_{min}$ at 47. If the minimum peak width $PW_{min}$ has been met or exceeded by the peak width counter, then the data encountered and determined to be above the threshold 16 is sent to the long-term storage memory 58 as indicated at 52. A selected number of data points immediately preceding and following a peak are counted and identified for storage, the particular number being input by the operator or set as a default. If the data point is above the threshold 16, the peak width counter is incremented at 48, and the peak width counter is compared to the maximum peak width $PW_{max}$ at 49. If the maximum peak width $PW_{max}$ is exceeded by the peak width counter, then the averaging is resumed at 42. Otherwise, it is determined whether the data point is the last data point in the spectrum at 56.

When the data points are identified as falling below the threshold 16, this designates the end of the peak, and the averaging process is resumed. In some cases, it may be beneficial to turn on the averaging process a number of data points after the data points fall below the threshold 16, such as, for example, to prevent any undershoots or ringing in the trailing edge of the peak from skewing the averaging process.

A special case applies if the spectrum is processed in blocks. After each data point is analyzed with respect to the threshold 16, regardless of whether the data point is above or below the threshold 16, the method 10 determines whether it is the last remaining data point in the block of data, as at 54,56. After the last data point is analyzed, the block of data is cleared from the buffer, after any selected data is delivered to storage 58. The method 10 processes the data in the spectrum block by block until the entire spectrum has been processed.

Other features are incorporated in alternate embodiments of the present invention, as disclosed above. For example, in any given block of data, a counter may be provided for counting the number of data points at the beginning and ending of each block of data in order to prevent losing data relevant to a peak which occurs in a break point between successive blocks of data. The method is also capable of determining when the background noise magnitude, deviation δ, is very small relative to the average background level so that higher y-valued data points in the background noise are not mis-identified as peaks. To this extent, as described above, when the method determines that the deviation δ is below a minimum value, the sensitivity k is multiplied by a factor, such as between 2 and 10, in order to raise the threshold 16 relative to the average background level 12. Alternatively, a minimum value for the product kδ can be selected by the operator for limiting the threshold value thereto. A further counter is provided for selecting every $n^{th}$ data point, regardless of whether or not it is identified as falling in a peak, where n is input by the operator or is set by default.

From the foregoing description, it will be recognized by those skilled in the art that a method and apparatus for the compression and filtering of data associated with spectrometry offering advantages over the prior art has been provided. Specifically, the method and apparatus of the present invention is provided for analyzing data to determine an estimated average of the background noise. From the estimated average background level, a deviation of the background noise with respect to the average is used to determine a threshold. Any point above the threshold is initially assumed to be a part of a peak. Data relevant to the peak and other selected data, such as data immediately preceding and following a peak, data at the beginning and ending of each block of data, or other selected data is transferred to storage while the remaining data is discarded as not useful. By discarding non-useful data, the required transfer rate of the data to storage and the required capacity of the storage are both greatly reduced. Tests run by using the method and apparatus of the present invention have proven that these parameters have been reduced by a factor of between 7 to 10 on average. A reduction on the order of a factor of 30 has been achieved, with potentially higher reductions, depending upon the variations in the background noise, the number and widths of individual peaks, and the initial parameters set by the operator or as defaults.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, We claim:

1. A method for compressing and filtering data comprising the steps of:

A) inputting a data set from data collection hardware into a processor, the data set including a plurality of data points each having an x component and a y component, said processor having at least one data input device for receiving input from the data collection hardware;

B) determining an initial background noise threshold;

C) continuously determining a new background noise threshold based upon the y component of a current data point and a current background noise threshold initially set at said initial background noise threshold;

D) determining which of said plurality of data points whose y component is more positive than said threshold and is part of a peak;

E) discarding data points whose y component is determined to be more negative than said background noise threshold; and F) storing data points whose y component is determined to be more positive than said background noise threshold.

2. The method of claim 1 wherein said step B) of determining an initial background noise threshold further comprises the steps of:
   i) sequentially averaging the y component of a plurality of data points in order to acquire an initial average background level;
   ii) sequentially comparing a deviation of each of the plurality of data points to said initial average background level to acquire an initial background noise deviation; and
   iii) multiplying said initial background noise deviation by a sensitivity constant and adding the product to said initial average background level to acquire said initial background noise threshold.

3. The method of claim 1 wherein said step C) of continuously determining a new background noise threshold based upon the y component of a current data point and a current background noise threshold initially set at said initial background noise threshold further comprises the steps of:
   i) sequentially comparing the y component of each data point with a current average background level to determine a data point deviation;
   ii) determining a new background noise deviation using said data point deviation and a current background noise deviation;
   iii) sequentially averaging the y component of each data point with said current average background level to acquire a new average background level; and
   iv) multiplying the new background noise deviation with a sensitivity constant and adding the product to said new average background level to acquire a new background noise threshold.

4. The method of claim 3 wherein said step ii) of determining a new background noise deviation using said data point deviation and a current background noise deviation includes the steps of:
   a) comparing the y component of the data point with said current average background level;
   b) averaging said data point deviation with said current background noise deviation to acquire said new background noise deviation when the y component of the data point is more negative than said current average background level; and
   c) setting said new background noise deviation equal to said current background noise deviation when the y component of the data point is more positive than said current average background level.

5. The method of claim 4 wherein said step b) of averaging said data point deviation with said current background noise deviation to acquire said new background noise deviation is accomplished using the formula:

$$\delta_{NEW} = \delta_{OLD} \exp(-1/\tau_\delta) + (1 - \exp(-1/\tau_\delta))|\delta_i|$$

where $\tau_\delta$ is a time constant.

6. The method of claim 5 wherein said time constant $\tau_\delta$ is determined by the equation:

$$\tau_\delta = m_\delta \times PW_{min}$$

where $m_\delta$ is a large number so that $\tau_\delta$ is large compared to a peak width and $PW_{min}$ is a minimum peak width.

7. The method of claim 3 wherein said step ii) of determining a new background noise deviation using said data point deviation and a current background noise deviation is accomplished by the step of averaging an absolute value of said data point deviation with said current background noise deviation to acquire said new background noise deviation.

8. The method of claim 7 wherein said step of averaging an absolute value of said data point deviation with said current background noise deviation to acquire said new background noise deviation is accomplished using the formula:

$$\delta_{NEW} = \delta_{OLD} \exp(-1/\tau_\delta) + (1 - \exp(-1/\tau_\delta))|\delta_i|$$

where $\tau_\delta$ is a time constant.

9. The method of claim 8 wherein said time constant $\tau_\delta$ is determined by the equation:

$$\tau_\delta = m_\delta \times PW_{min}$$

where $m_\delta$ is a large number so that $\tau_\delta$ is large compared to a peak width and $PW_{min}$ is a minimum peak width.

10. The method of claim 3 wherein said step ii) of determining a new background noise deviation using said data point deviation and a current background noise deviation further comprises the steps of:
   a) comparing the y component of the data point with said current average background level minus said current background noise deviation;
   b) setting the new background noise deviation equal to said current average background level minus the y component of the data point when the y component of the data point is more negative than said current average background level minus said current background noise deviation; and
   c) decreasing said background noise deviation by a fraction when the y component of the data point is more positive than said current average background level minus said current background noise deviation.

11. The method of claim 3 wherein said step ii) of determining a new background noise deviation using said data point deviation and a current background noise deviation further comprises the steps of:
   a) comparing the y component of the data point with said current average background level minus said current background noise deviation;
   b) when the y component of the data point is more negative than said current average background level minus said current background noise deviation:
      i) subtracting the y component of the data point from a sum of said current average background level minus said current background noise deviation to determine a negative offset; and
      ii) adding a fraction of said negative offset to said current background noise deviation;
   c) decreasing said current background noise deviation by a fraction thereof when the y component of the data point is more positive than said current average background level minus said current background noise deviation.

12. A method for compressing and filtering data associated with spectrometry, said method comprising the steps of:
   A) inputting a data set from data collection hardware into a processor, the data set including a plurality of data points each having an x component and a y component, said processor having at least one data input device for receiving at least operator input and input from data collection hardware,
   B) sequentially averaging the y component of a plurality of data points in order to acquire an average background level;

C) sequentially comparing a deviation of each of the plurality of data points to said average background level to acquire a background noise deviation;

D) multiplying said background noise deviation by a sensitivity constant and adding the product to said average background level to acquire a threshold;

E) comparing the next subsequent data point to said initial threshold to determine whether the y component is above said initial threshold;

F) identifying whether the data point is within a peak when the y component of the data point is above said threshold;

G) when the y component of the data point is more negative than said threshold,
  i) comparing the y component with the average background level to determine a data point deviation;
  ii) determining a new background noise deviation using said data point deviation and said background noise deviation;
  iii) averaging the y component with said average background level to acquire a new average background level;
  iv) multiplying the new background noise deviation with said sensitivity constant and adding the product to said new average background level to acquire a new threshold, H) repeating said steps E) through G) for all data points in the data set;

I) identifying data points to be stored;

J) transferring data points identified to be stored in said step I) to a storage medium; and K) discarding data points not identified to be stored in said step I).

13. The method of claim 12 wherein said step Giii) of averaging the y component with said average background level to acquire a new average background level is accomplished using the formula:

$$y_{Ave-NEW} = y_{Ave-OLD} \exp(-1/\tau_y) + (1-\exp(-1/\tau_y))y_i$$

where $\tau_y$ is a time constant.

14. The method of claim 13 wherein said time constant $\tau_y$ is determined by the equation:

$$\tau_y = m_y \times PW_{min}$$

where $m_y$ is a large number so that $\tau_\delta$ is large compared to a peak width and $PW_{min}$ is a minimum peak width.

15. The method of claim 12 wherein said step Gii) of determining a new background noise deviation using said data point deviation and said background noise deviation includes the steps of:
  a) comparing the y component of the data point with said average background level;
  b) averaging said data point deviation with said background noise deviation to acquire said new background noise deviation when the y component of the data point is more negative than said average background level;
  c) setting said new background noise deviation equal to said background noise deviation when the y component of the data point is more positive than said average background level.

16. The method of claim 15 wherein said step b) of averaging said data point deviation with said background noise deviation to acquire said new background noise deviation is accomplished using the formula:

$$\delta_{NEW} = \delta_{OLD} \exp(-1/\tau_\delta) + (1-\exp(-1/\tau_\delta))|\delta_i|$$

where $\tau_\delta$ is a time constant.

17. The method of claim 16 wherein said time constant $\tau_\delta$ is determined by the equation:

$$\tau_\delta = m_\delta \times PW_{min}$$

where $m_\delta$ is a large number so that $\tau_\delta$ is large compared to a peak width and $PW_{min}$ is a minimum peak width.

18. The method of claim 12 wherein said step Gii) of determining a new background noise deviation using said data point deviation and a curent background noise deviation is accomplished by the step of averaging an absolute value of said data point deviation with said background noise deviation to acquire said new background noise deviation.

19. The method of claim 18 wherein said step of averaging an absolute value of said data point deviation with said current background noise deviation to acquire said new background noise deviation is accomplished using the formula:

$$\delta_{NEW} = \delta_{OLD} \exp(-1/\tau_\delta) + (1-\exp(-1/\tau_\delta))|\delta_i|$$

where $\tau_\delta$ is a time constant.

20. The method of claim 19 wherein said time constant $\tau_\delta$ is determined by the equation:

$$\tau_\delta = m_\delta \times PW_{min}$$

where $m_\delta$ is a large number so that $\tau_\delta$ is large compared to a peak width and $PW_{min}$ is a minimum peak width.

21. The method of claim 12 wherein said step Gii) of determining a new background noise deviation using said data point deviation and said background noise deviation includes the steps of:
  a) comparing the y component of the data point with said background noise deviation;
  b) setting the new background noise deviation equal to said average background level minus the y component of the data point when the y component of the data point is more negative than said average background level minus said background noise deviation; and
  c) decreasing said background noise deviation by a fraction when the y component of the data point is more positive than said average background level minus said background noise deviation.

22. The method of claim 12 wherein said step Gii) of determining a new background noise deviation using said data point deviation and said background noise deviation includes the steps of:
  a) comparing the y component of the data point with said average background level minus said background noise deviation;
  b) when the y component of the data point is more negative than said average background level minus said background noise deviation:
    i) subtracting the y component of the data point from a sum of said average background level minus said background noise deviation to determine a negative offset; and
    ii) adding a fraction of said negative offset to said background noise deviation;
  c) decreasing said background noise deviation by a fraction thereof when the y component of the data point is more positive than said average background level minus said background noise deviation.

23. The method of claim 12, in said step I) of identifying data points to be stored, wherein said data points identified to be stored are chosen from the group consisting of at least data points identified in said step F) of identifying whether the data point is within a peak when the y component of the data point is above said threshold; a plurality of data points at a start and an end point of a block of data; a periodic data point; and a plurality of data points immediately preceding and succeeding a peak.

24. The method of claim 23 in said step F) of identifying whether the data point is within a peak when the y component of the data point is above said threshold is accomplished by counting a number consecutive data points having a y component above said threshold and determining whether the number of consecutive data points at least equals a minimum peak width.

25. The method of claim 12 in said step F) of identifying whether the data point is within a peak when the y component of the data point is above said threshold is accomplished by counting a number of consecutive data points having a y component above said threshold and determining whether the number of consecutive data points is no greater than a maximum peak width.

26. The method of claim 12, before said step B) of sequentially averaging the y component of a plurality of data points, further comprising the step of averaging an initial plurality of data points in the data set to determine an initial average background level, an initial background noise deviation, and an initial threshold.

27. The method of claim 12, after said step D) of multiplying said background noise deviation by a sensitivity constant and adding the product to said average background level to acquire a threshold, further comprising the steps of:
   i) comparing said threshold to a minimum threshold level to determine whether said threshold is more positive than said minimum threshold level; and
   ii) adjusting said threshold when said threshold is more negative than said minimum threshold level.

28. The method of claim 27 whereby said step ii) of adjusting said threshold when said threshold is more negative than said minimum threshold level is accomplished by increasing said sensitivity constant.

29. The method of claim 27 whereby said step ii) of adjusting said threshold when said threshold is more negative than said minimum threshold level is accomplished by setting said threshold equal to said minimum threshold level.

30. An apparatus for compressing and filtering data associated with spectrometry and received from data collection hardware, said apparatus comprising:
   a processor for inputting and processing data received from data collection hardware, the data set including a plurality of data points each having an x component and a y component, said processor being provided for continuously determining a threshold value for each data point and comparing a subsequent data point to determine whether the subsequent data point is within a peak, said processor also being provided for determining which data points of the data set are to be stored;
   at least one input device for transmitting at least operator input and input from the data collection hardware; and
   data storage device for receiving data identified by said processor.

31. The apparatus of claim 30 wherein said processor is configured to sequentially average the y component of a plurality of data points in order to acquire an average background level; sequentially compare a deviation of each of the plurality of data points to said average background level to acquire a background noise deviation; multiply said background noise deviation by a sensitivity constant and adding the product to said average background level to acquire said threshold.

32. The apparatus of claim 31 wherein said processor is further configured to compare each data point sequentially to said threshold to determine whether the data point is within a peak when the y component of the data point is more positive than said threshold.

33. The apparatus of claim 31 wherein said processor is further configured to compare each data point sequentially to said threshold to determine a new average background level, a new background noise deviation, and a new threshold when the y component of the data point is more negative than said threshold.

34. An apparatus for compressing and filtering data associated with spectrometry and received from data collection hardware, said apparatus comprising:
   a processor for inputting and processing data received from data collection hardware, the data set including a plurality of data points each having an x component and a y component, said processor being provided for determining a threshold value for each data point and comparing a subsequent data point to determine whether the subsequent data point is within a peak, said processor also being provided for determining which data points of the data set are to be stored, said processor being configured to:
      sequentially average the y component of a plurality of data points in order to acquire an average background level;
      sequentially compare a deviation of each of the plurality of data points to said average background level to acquire a background noise deviation; and
      multiply said background noise deviation by a sensitivity constant and adding the product to said average background level to acquire said threshold,
   said processor being further configured to compare each data point sequentially to said threshold to determine whether the data point is within a peak when the y component of the data point is more positive than said threshold, and to compare each data point sequentially to said threshold to determine a new average background level, a new background noise deviation, and a new threshold when the y component of the data point is more negative than said threshold;
   at least one input device for transmitting at least operator input and input from the data collection hardware; and
   data storage device for receiving data identified by said processor.

* * * * *